（12) United States Patent
Shah et al.

(10) Patent No.: US 11,652,921 B2
(45) Date of Patent: May 16, 2023

(54) CONTACT CENTER OF CELEBRITIES

(71) Applicant: Avaya Management L.P., Santa Clara, CA (US)

(72) Inventors: Shamik Shah, Pune (IN); Valentine C. Matula, Granville, OH (US); Pushkar Yashavant Deole, Pune (IN); Sandesh Chopdekar, Pune (IN); Navin Daga, Silapathar (IN)

(73) Assignee: Avaya Management L.P., Santa Clara, CA (US)

( * ) Notice: Subject to any disclaimer, the term of this patent is extended or adjusted under 35 U.S.C. 154(b) by 0 days.

(21) Appl. No.: 17/003,392

(22) Filed: Aug. 26, 2020

(65) Prior Publication Data

US 2022/0070295 A1    Mar. 3, 2022

(51) Int. Cl.
*H04M 3/00*        (2006.01)
*H04M 5/00*        (2006.01)
(Continued)

(52) U.S. Cl.
CPC ............ *H04M 3/493* (2013.01); *G06N 3/006* (2013.01); *G06N 20/00* (2019.01); *G06Q 30/016* (2013.01);
(Continued)

(58) Field of Classification Search
CPC ......... G06T 19/006; G06T 2207/10016; G06T 13/40; G06T 13/20; G06T 19/003; G06T 11/00; G06T 19/20; G06T 2200/04; G06T 2207/10; H04N 21/4532; H04N 21/25891; H04N 21/4126; H04N 21/4667; H04N 21/252; H04N 21/4722; H04N 21/4756; H04N 21/44222; H04N 21/8133; H04N 21/84; H04N 21/4755; H04N 21/8545; H04N 21/251; G06F 3/04842;
(Continued)

(56) References Cited

U.S. PATENT DOCUMENTS 7,728,866 B2   6/2010   Currivan et al.
7,933,399 B2   4/2011   Knott et al.
(Continued)

FOREIGN PATENT DOCUMENTS

WO   WO 2015/101523   7/2015

OTHER PUBLICATIONS

Kan "Deepfaking a Celebrity on a Zoom Call is Now Possible," PCMag UK, Apr. 17, 2020, 7 pages [retrieved online from: uk.pcmag.com/video-conferencing/125699/deepfaking-a-celebrity-on-a-zoom-call-is-now-possible].
(Continued)

*Primary Examiner* — Kharye Pope
(74) *Attorney, Agent, or Firm* — Sheridan Ross P.C.

(57) ABSTRACT

Customers can become bored with an interaction with an agent. By providing speech and/or images, of a celebrity disguising the speech, and/or image, of the agent, customers can appear to interact with a particular celebrity. As a result, customers are more likely to stay engaged and have a positive experience. The celebrity, or a particular persona of a celebrity, may be selected from customer preferences and/or a purpose of the call. For example, a movie star's role may have a persona, such as a "heavy," suitable for collection calls (audio or audio-video), whereas a scientific or technical innovator may be selected for technical support calls.

20 Claims, 6 Drawing Sheets

(51) Int. Cl.

| | |
|---|---|
| *H04L 12/66* | (2006.01) |
| *H04M 3/493* | (2006.01) |
| *G06T 11/00* | (2006.01) |
| *H04M 3/51* | (2006.01) |
| *G10L 19/00* | (2013.01) |
| *G06Q 30/016* | (2023.01) |
| *G06N 3/006* | (2023.01) |
| *G06N 20/00* | (2019.01) |
| *G10L 21/013* | (2013.01) |

(52) U.S. Cl.
CPC .............. *G06T 11/00* (2013.01); *G10L 19/00* (2013.01); *G10L 21/013* (2013.01); *H04M 3/51* (2013.01); *G10L 2021/0135* (2013.01)

(58) Field of Classification Search
CPC ........ G06F 3/167; G06F 3/011; G06F 3/0482; G06F 16/7834; H04M 3/5191; H04M 3/5233; H04M 3/42068; H04M 2203/551; H04M 2203/556; H04M 3/523; H04M 3/5183; H04M 3/5175; H04M 3/5232; H04M 2201/40; H04M 3/42059; H04M 3/5133; H04M 3/5166; H04M 3/42221; H04M 2203/408; H04M 2203/558; H04M 3/42042; H04M 3/493; H04M 3/51; H04M 2203/2038; H04M 3/5158; H04M 3/5315; H04M 2201/50; H04M 3/42102; G06Q 30/016; G06Q 30/0257; G06Q 10/063112; G06Q 30/0243; G06Q 30/0271; G06Q 30/0613; G06Q 30/0255
USPC ............ 379/265.09, 265.06, 265.11, 265.12, 379/265.13; 370/352
See application file for complete search history.

(56) References Cited

U.S. PATENT DOCUMENTS

| | | | |
|---|---|---|---|
| 8,634,543 | B2 | 1/2014 | Flockhart et al. |
| 10,846,517 | B1* | 11/2020 | Bulusu .................. G06Q 30/02 |
| 2006/0215831 | A1* | 9/2006 | Knott ................... H04M 3/493 |
| | | | 379/211.02 |
| 2008/0126426 | A1* | 5/2008 | Manas .................. G06Q 30/02 |
| 2009/0024590 | A1* | 1/2009 | Sturge .................. G06F 16/972 |
| 2010/0235218 | A1 | 9/2010 | Erhart et al. |
| 2010/0296417 | A1 | 11/2010 | Steiner |
| 2011/0125793 | A1 | 5/2011 | Erhart et al. |
| 2011/0125826 | A1 | 5/2011 | Erhart et al. |
| 2013/0242031 | A1 | 9/2013 | Petterson et al. |
| 2013/0257876 | A1 | 10/2013 | Davis |
| 2013/0257877 | A1* | 10/2013 | Davis .................... G06N 3/006 |
| | | | 345/473 |
| 2014/0210831 | A1* | 7/2014 | Stenger .................. G06T 13/40 |
| | | | 345/474 |
| 2014/0355748 | A1* | 12/2014 | Conway ............. H04M 3/5233 |
| | | | 379/265.1 |
| 2019/0058740 | A1* | 2/2019 | Singman .............. H04L 65/1069 |
| 2019/0130628 | A1* | 5/2019 | Cao .................... G06K 9/00228 |
| 2020/0051565 | A1* | 2/2020 | Singh ...................... G10L 15/02 |
| 2020/0175737 | A1* | 6/2020 | Barber .................. G06T 3/0068 |
| 2020/0413009 | A1* | 12/2020 | Horio ..................... G06F 3/167 |
| 2021/0248801 | A1* | 8/2021 | Li ......................... G06T 13/205 |

OTHER PUBLICATIONS

Official Action for United Kingdom Patent Application No. GB2112176.9, dated Feb. 28, 2022 10 pages.
Official Action for United Kingdom Patent Application No. GB2112176.9, dated Nov. 25, 2022 11 pages.

* cited by examiner

CONTACT CENTER OF CELEBRITIES

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for altering communication content and particularly to provide a purpose-specific presentation to a user.

BACKGROUND

Customers trying to perform a task or talk to a live contact center agent may find that no live agent is presently available or that a selection process must be navigated to direct the call to an appropriate agent or pool of agents. As a result, customers may be presented with generated or previously recorded spoken messages, such as "on hold" content or as a description or prompt for an interactive voice response (IVR) or other selection mechanism.

In a contact center, listening to the plain voice of an IVR or previously recorded messages can quickly become very boring. This may be particular true when the customer dislikes the voice. Once a customer is connected with a live agent, the customer may be more difficult to please if they have endured a lengthy session with a boring or unpleasant voice.

SUMMARY

In this day and age, where people constantly want to be entertained, providing an agent interaction presented as a celebrity or other character of choice is less boring and potentially an attractive option for the contact center offer.

These and other needs are addressed by the various embodiments and configurations of the present invention. The present invention can provide a number of advantages depending on the particular configuration. These and other advantages will be apparent from the disclosure of the invention(s) contained herein.

In a call (audio or audio/video) between a customer and a contact center agent, the call would be richer and more pleasant if the interaction with the agent is personalized. In particular, if the interaction is personalized to provide the customer to speak with a presented persona, such as a celebrity, business tycoon, historical figure, fantasy character, or other character of choice. Using Artificial Intelligence (AI), such as a neural network, the voice (for audio calls or audio portion of an audio/video call) and face may be overlaid over the actual live agent's face and/or voice so the customer is presented with speech, and/or images, of the desired entity. This could result into a desired change in customers' sentiment and hence optimized interaction between the agent and customer.

In one embodiment, an overlay/augment/replace the agent's voice and/or face is provided to present the customer with the agent having the voice and/or face of the desired persona (herein referred to as "celebrity").

The facial movements (e.g., muscle movement, jaw movement, head tilt, etc.) may be mapped to the celebrity's face in real time to provide corresponding life-like visuals matching the speech and facial expressions of the celebrity. For speech, the tone and pitch of the voice of agent are also mapped to that of the celebrity's in real time.

Embodiments may include an image-type to be used to provide the celebrity's face (and other body parts) including, an avatar of the celebrity, a cartoon of the celebrity, and real photos and videos of the celebrity.

When customer's interaction is assigned an agent, the agent's video and audio streams are processed through the AI algorithms which analyze the video and audio stream in real time and use the trained data in order to layover the facial images.

Another set of AI algorithms are fed with audio stream of agent and the audio is manipulated by AI with the help of voice samples data provided through training database to layover the agent speaking, smiling etc.

In another embodiment, the selection of the celebrity may be made from any notable person including, but not limited to having notoriety from movies, television, famous business personalities, sports, technology, history, politics, performing arts (e.g., singer, dancer, comedian, play star, musician, writer, etc.), characters from books, mythology, fiction, video games, cartoon characters, etc.

In another embodiment, the selection of a particular celebrity may be based on customer data collected from one or more sources, including but not limited to:
 social media sites, customer's interests, likes/dislikes, etc.; and
 A type or category of the call and/or a related business or industry. For example, if the call is regarding the purchase or pre-purchase inquiry for TV, LED, then a celebrity known in that field/movies/series may be selected. For technical support issues related to a laptop, computer, or software, a technology industry celebrity, such as Bill Gates or Steve Jobs, may be selected. If the call is related to a financial or credit issue, a popular businessperson's face can be chosen.

While a component of the contact center may make the selection, in another embodiment, the customer is provided the opportunity to select the celebrity of their choice. Their selection can be either saved for a specific period, after which they can be again prompted to provide the same/different choice. The options provided can also vary based on the type of the call e.g. marketing, sales, recovery, tech issue, etc. Additionally or alternatively, the customer may provide the contact center with the necessary data file(s) to enable a particular persona. For example, the customer may either upload the data file(s) or provide a link to an accessible location having the data file(s). As a result, the customer may select, modify, and/or generate their own celebrity data file(s), provide the data file(s) and/or links to data file(s) maintained by a third-party repository, and interact with an agent having the voice and/or image of that celebrity.

In another embodiment of the proposed idea, various forms/characters played by the same celebrity can be selected each time the customer calls. For example, if the chosen celebrity is X who as a character from a particular movie. For a subsequent call, the celebrity is the same actor but as a different characters from a different movie.

In another embodiment, if multiple agents and supervisors get involved in the call by means of transfer or conference, then pairs of celebrities may be selected. This may be the same celebrity in both roles, but the roles differ in the particular character portrayed in different movies. Alternatively, the character pairs may have a fictional (e.g., from a movie) relationship, such as boss/employee, father/son, etc. with the supervisor utilizing the celebrity having the higher-status role (e.g., the boss, the father, etc.). If the call is transferred to another agent or a specialized agent, they too will take up a character that is positively or negatively related to the X's character in the same source (e.g., the particular movie, television, web-series, etc.).

In another embodiment, there can also be a negative selection, which would not allow a particular celebrity/character for a particular type of call if found to be not suited. For example, an overly polite and humble character cannot be chosen for a recovery call. In a similar way, an aggressive/villain/vamp personality cannot be chosen for a marketing/sales call.

Exemplary aspects are directed to a system for presenting an agent as a celebrity to a 1.

A system for presenting an agent as a celebrity to a customer, comprising:
    a network interface to a network; and
    a processor having machine-executable instructions to perform:
        accessing a call comprising a customer communication device utilized by the customer and wherein the call utilizes the network;
        accessing a purpose from at least one of a customer history or a reason for the call comprising video;
        selecting a celebrity profile of the celebrity, from a pool of celebrity profiles, previously determined to match the purpose and wherein the celebrity profile comprises image attributes;
        receiving a received image from the agent from a camera associated with an agent communication device connected to the call;
        generating a processed image from the received image modified with the image attributes; and
        providing video signals to the customer communication device comprising the processed image encoded for transmission over the network.

Exemplary aspects are directed to an agent communication device, comprising:
    a microphone;
    a network interface to a network;
    a processor having machine-executable instructions to perform:
        engaging in a call comprising a customer communication device utilized by a customer via the network;
        accessing a purpose from at least one of a customer history or a reason for the call;
        selecting a celebrity profile of the celebrity, from a pool of celebrity profiles, previously determined to match the purpose and wherein the celebrity profile comprises voice attributes;
        receiving received speech from the agent from the microphone;
        generating processed speech from the received speech modified with the voice attributes; and
        providing audio signals to the customer communication device comprising the processed speech encoded for transmission over the network.

Any of the above aspects, wherein the image attributes comprise at least one visual element; and the generating of the processed image comprises applying the at least one visual element to an associated portion of image attribute of the received image.

Any of the above aspects, wherein the at least image attribute comprises a recorded video image.

Any of the above aspects, wherein the at least one phoneme of speech of the celebrity comprises a recording of the celebrity speaking the at least one phoneme of speech.

Any of the above aspects, wherein the image attribute comprises least one of eye, nose, ears, mouth, wardrobe element, style, complexion, chin, lips, facial features such as skin tone, size and shape of whole face, and forehead.

Any of the above aspects, wherein the voice attributes comprise at least one of pitch, pace, change in pitch, change in pace, and extraneous sounds.

Any of the above aspects, wherein the purpose comprises a preference of the customer.

Any of the above aspects, wherein the machine-executable instructions cause the processor to further perform:
accessing a data record indicating at least one of a previously indicated preference or a previously indicated dislike for at least one of the pool of celebrities; and
wherein the selecting of the celebrity profile, from the pool of celebrities, further comprises selecting the celebrity profile from a subset of the pool of celebrities, the subset of the pool of celebrities being selected from the pool of celebrities wherein ones of the selected pool of the celebrities are associated with celebrities further associated with the previously indicated preferences and excludes the pool of celebrities wherein ones of the selected pool of the celebrities are associated with celebrities further associated with the previously indicated dislike.

Any of the above aspects, wherein the celebrity profile comprises a first persona of a celebrity in one of a number of prior performances.

Any of the above aspects, wherein the celebrity profile comprises a second persona of the celebrity in a different one of the number of prior performances.

Any of the above aspects, wherein the pool of celebrity profiles excludes celebrity profiles of celebrities having a previously determined data attribute counter to the purpose.

Any of the above aspects, wherein: the image attributes comprise at least one visual element; and the generating of the processed image comprises applying the at least one visual element to an associated portion of image attribute of the received image.

Any of the above aspects, wherein the instructions cause the processor to further perform:
receiving a video image from a camera associated with the agent communication device;
generating a processed image from the video image modified with the visual attributes; and
providing video signals to the customer communication device comprising the processed image encoded for transmission over the network Any of the above aspects, wherein:
the voice attributes comprise at least one phoneme of speech of the celebrity; and
the generating of the processed speech comprises replacing a spoken phoneme within the received speech with the at least one phoneme of speech of the celebrity.

Any of the above aspects, wherein the at least one phoneme of speech of the celebrity comprises a recording of the celebrity speaking the at least one phoneme of speech.

Any of the above aspects, wherein the voice attributes comprise at least one of pitch, pace, change in pitch, change in pace, or extraneous sounds.

Any of the above aspects, wherein the purpose comprises a preference of the customer.

Any of the above aspects, further comprising:

accessing a data record indicating at least one of a previously indicated preference or a previously indicated dislike for at least one of the pool of celebrities; and wherein the selecting of the celebrity profile, from the pool of celebrities, further comprises selecting the celebrity profile from a subset of the pool of celebrities, the subset of the pool of celebrities being selected from the pool of celebrities wherein ones of the selected pool of the celebrities are associated with celebrities further associated with the previously indicated preferences and excludes the pool of celebrities wherein ones of the selected pool of the celebrities are associated with celebrities further associated with the previously indicated dislike.

Any of the above aspects, wherein the celebrity profile comprises a first persona of a celebrity in one of a number of prior performances.

Any of the above aspects, wherein the pool of celebrity profiles excludes celebrity profiles of celebrities having a previously determined data attribute counter to the purpose.

Any of the above aspects, further comprising:

receiving a video image from a camera associated with the agent communication device and wherein the celebrity profile further comprises visual attributes;

generating a processed image from the video image modified with the visual attributes; and providing video to the customer communication device comprising the processed image.

A system on a chip (SoC) including any one or more of the above aspects.

One or more means for performing any one or more of the above aspects.

Any one or more of the aspects as substantially described herein.

Any of the above aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
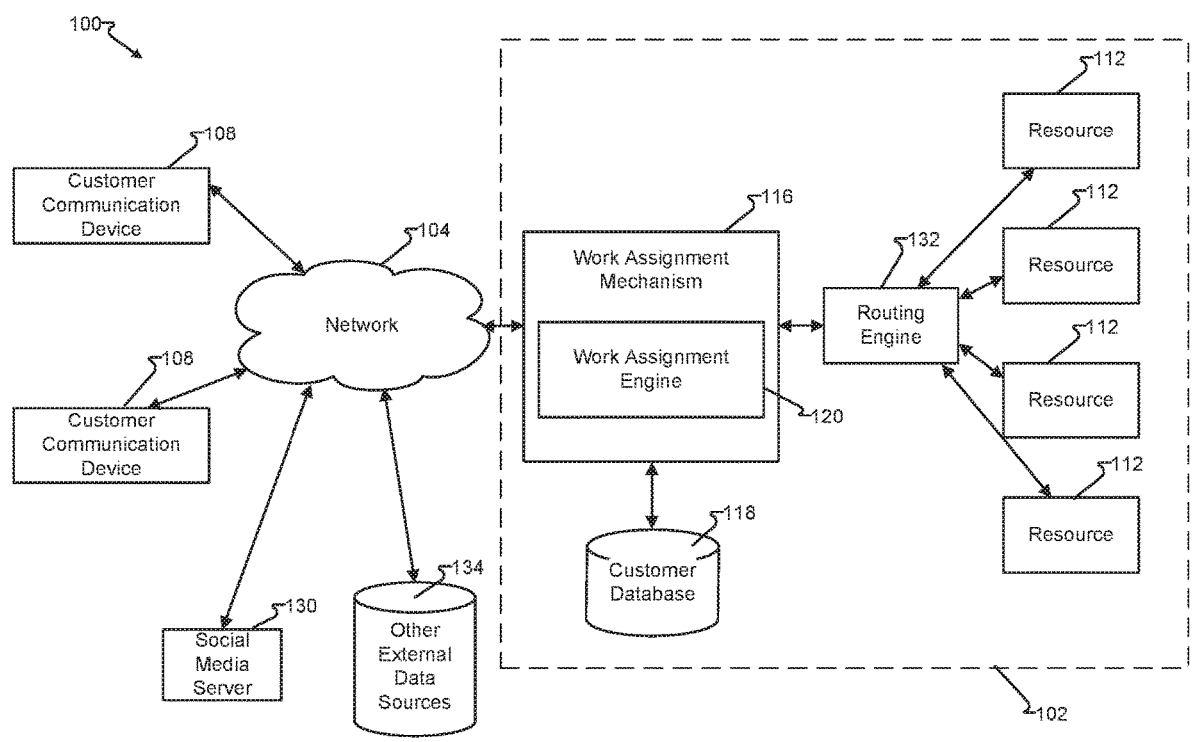
FIG. 1 depicts a first system in accordance with embodiments of the present disclosure.

With reference now to FIG. 1, system 100 is discussed in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are, or are associated with, work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The customer communication devices 108 may correspond to customer communication devices. In accordance with at least some embodiments of the present disclosure, a customer may utilize their customer communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media server 130 or network of servers. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the customer communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the customer communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the customer communication devices 108 may comprise any type of known communication equipment or collection of communication equipment. Examples of a suitable customer communication device 108 include, but are not limited to, a personal computer, laptop, Personal Digital Assistant (PDA), cellular phone, smart phone, telephone, or combinations thereof. In general, each customer communication device 108 may be adapted to support video, audio, text, and/or data communications with other customer communication devices 108 as well as the processing resources 112. The type of medium used by the customer communication device 108 to communicate with other customer communication devices 108 or processing resources 112 may depend upon the communication applications available on the customer communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more hardware components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage hardware components may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
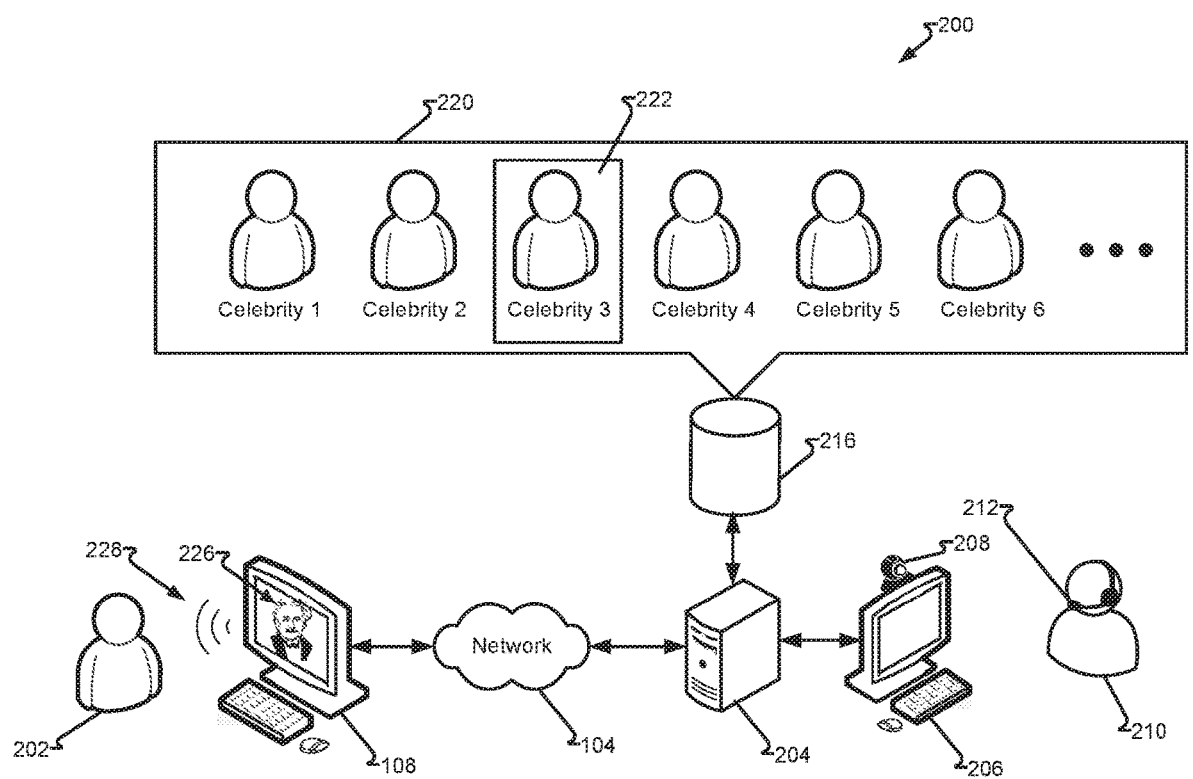
FIG. 2 depicts second system in accordance with embodiments of the present disclosure.

FIG. 2 depicts system 200 in accordance with embodiments of the present disclosure. In one embodiment, system 200 illustrates an alternative configuration of system 100 wherein portions of system 100 are omitted from system 200 to avoid unnecessarily complicating the figure and associated description. System 200 may also comprise additional components and/or additional configurations and/or features of components from those of system 100. In one embodiment, resource 112 is embodied as agent 210 utilizing agent communication device 206 to engage in a call with customer 202, using customer communication device 108. Customer communication device 108 and agent communication device 206 communicating over network 104. In another embodiment, server 204 may be utilized as another node on the call, a monitor of the call, a facilitator of the call, and/or other telephony equipment. For example, server 204 may comprise features such as work assignment mechanism 116, work assignment engine 120, routing engine 132, switches, routers, resource 112 (when embodied as an automated resource, such as an IVR system), etc. While features of server 204 are, in one embodiment and as illustrated, discrete from agent communication device 206. In another embodiment, some or all of the functionality of server 204 may be embodied as a portion of agent communication device 206.

Customer 202 is engaged in a call with agent 210. Before or during the call being connected to agent communication device 206 a purpose is determined, such as by a processor executing machine-readable and machine-executable instructions. The purpose may be determined by the customer, such as by interacting with an automated embodiment of resource 112 (e.g., an IVR) or other system where a particular purpose for the call may be identified. Customer 202 may have initiated the call by calling a limited-purpose telephone number (e.g., "for new sales call 800-000-0001," "For questions about your account, call 800-000-0002," etc.). Additionally or alternatively, server 204 may determine a purpose from a prior interaction, such as via an entry within customer database 118. Additionally or alternatively, the purpose may be based on sentiment. For example, customer 202 may be upset and to help promote a civil interaction as a means to resolve the issue, and change the negative sentiment into a positive (or less negative) sentiment, the purpose may be to provide a calm, soothing, or other placating persona to customer 202. This may be determined proactively, for example, if customer 202 has called before with the same issue they are likely to become heated, even without first observing such a response. Accordingly, the purpose may be to anticipate the state of customer 202 and select an appropriate persona to help gather required information, communicate instructions, and/or otherwise resolve the work item or other purpose for the call. Additionally or alternatively, a queue length and estimated wait time may determine a purpose to manage sentiment for long wait times and the selected celebrity profile.

Additionally or alternatively, the call may be initiated from a component of system 100 and/or system 200 (e.g., outbound calls), such as an automated dialer which, upon the call being answered at customer communication device 108, the call is connected to agent communication device 206. In embodiments where the call is an outbound call, the purpose may be determined solely by contact center 102, such as from an entry in customer database 118.

In order to improve the call (audio or audio-video), selected celebrity profile 222 is selected in accordance with a purpose from a pool of celebrity profiles 220 such as maintained in data storage 216 and/or other data storage. The purpose may be to accommodate a preference, or avoidance of a dislike, of customer 202 or as an enhancement of the purpose. For example, to make a technical support call more engaging, receiving modified audio 228 comprising the speech of a celebrity having an association with technology, innovation, or science (e.g., Albert Einstein, etc.) may be selected. A call having purpose of collecting a past-due payment may utilize a "heavy" from a movie or television show, such as a soldier, warrior, etc. Other purposes may utilize other celebrities and their associated profiles or personas. For example, a particular selected celebrity profile 222 may be an actor having a particular persona from one movie, associated with a purpose, and a different persona from a different movie, associated with a different purpose. Additionally or alternatively, a favorite (or at least not disliked) celebrity may be associated with selected celebrity profile 222, or a persona alteration thereof, such as to provide variety and interest for subsequent calls.

Pool of celebrity profiles 220 may be maintained as records in data storage 216 and comprise machine-readable modifications to a phoneme, word, phrase, or other vocalization associated with ones of pool of celebrity profiles 220. For example, a particular phoneme may be described in terms of a target sound (e.g., adjust pitch to a particular level, change the pitch according to a particular pattern, adjust the pace of speech to a particular level, change the pace of speech according to a particular pattern, etc.). Additionally or alternatively, data storage 216 may comprise recordings of phonemes, words, phrase, or other vocalizations associated with one of pool of celebrity profiles 220. Therefore, as agent 210 speaks, the individual components spoken are replaced with recordings to produce modified audio 228.

Speech provided by agent 210 is picked up by microphone 212 and converted to sound like a celebrity from data associated with selected celebrity profile 222. When the call comprises video, camera 208 may capture images of agent 210 and apply overlays or other modifications from selected celebrity profile 222 to present modified image 226 of the celebrity. Celebrity profile 222 may comprise an overall image (e.g., "deep fake") or a visual element of an image, such as eyes, nose, mouth, hair, wardrobe (e.g., eyeglasses, jewelry, hat, helmet, and/or costume or portions thereof wore in a particular role, etc.). The image may then be overplayed onto the image of agent 210 or mapped to corresponding body parts of the image of agent 210. For example, the ears, nose, eyes, mouth, style, complexion, chin, lips, facial features such as skin tone, size and shape of whole face, forehead, and/or other body/facial attribute from the celebrity profile are morphed to overlay corresponding portions of the image of agent 210.

As a benefit of the embodiments, customer 202 may receive the substantive content of the call comprising the words spoken by agent 210, but as presented by modified audio 228 from a speaker (not shown) of customer communication device 108, as if from a selected celebrity.

Figure 3:
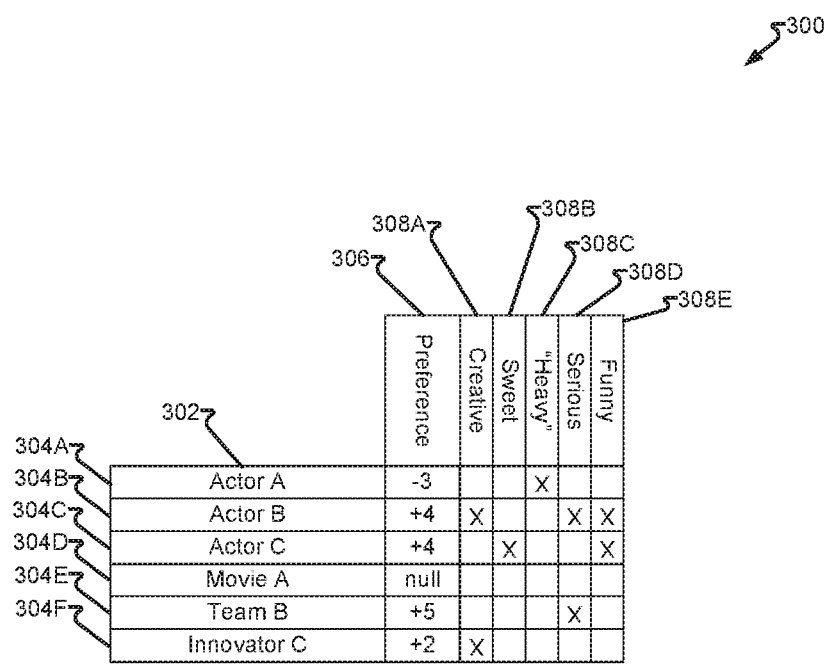
FIG. 3 depicts first data structure in accordance with embodiments of the present disclosure.

FIG. 3 depicts data structure 300 in accordance with embodiments of the present disclosure. In one embodiment, data structure 300 is maintained in a non-transitory data storage, such as customer database 118, for access by one or more processors, such as a processor of server 204 and/or a processor of agent communication device 206.

In one embodiment, data structure 300 comprises a number of records 304 each having fields. Name fields 302 identify a particular celebrity of a pool of celebrities, such via a name and/or index associated with entries of pool of celebrity profiles 220. For a particular customer 202, the customer may have preference 306 of likes and/or dislikes, or a scale thereof, of a particular celebrity. For example, social media server 130 may be accessed to identify and favorable or unfavorable comments, endorsements, or other indicators associated with a particular celebrity, such as those identified in name field 302 of record 304A, 304B, and 304C, and/or association of celebrities. An association of celebrities may comprise a number of actors from a particular movie, such as the movie identified in name field 302 of record 304D, or team members of a sports team, such as those associated with name field 302 of record 304E. The celebrity may also comprise innovators, such as that identified in name field 302 of record 304F. If no preference can be determined, the associated value in preference 306 may be null, zero, or otherwise indicate unknown or indifference.

One or more celebrity attributes 308 are provided for records 304. For example, celebrity attributes 308 may comprise celebrity attribute 308A, indicating that the associated record is for a celebrity indicating whether the celebrity is known to be creative, celebrity attribute 308B indicating that the associated record is for a celebrity having a particular persona personally or a persona of a character the celebrity planed in one or more roles. Accordingly, celebrity attribute 308 may indicate whether the celebrity, or associated persona, is known to be "sweet," celebrity attribute 308C indicating that the associated record is for a celebrity indicating whether the celebrity is known to be a "heavy," celebrity attribute 308D indicating that the associated record is for a celebrity indicating whether the celebrity is known to be serious, and celebrity attribute 3087E indicating that the associated record is for a celebrity indicating whether the celebrity is known to be funny.

Accordingly the purpose of a call determines which records 304 are selected. For example, if the purpose of a call is process a new sale and possible up-sale customer 202, then having an indicator of one or more of celebrity attribute 308A (creative), celebrity attribute 308B (sweet), or celebrity attribute 308E (funny) may be desired. If a purpose is debt collection then determining whether a celebrity has attributes favorable to debt-collecting may be determined, such as celebrity attribute 308C ("heavy") or celebrity attribute 308D (serious). It should be appreciated that these or other purposes may utilize other celebrity attribute 308 beyond those illustrated. Additionally or alternatively, the selected record 304 may be narrowed to support the particular purpose and further narrowed or selected based on a value of preference 306.

Figure 4:
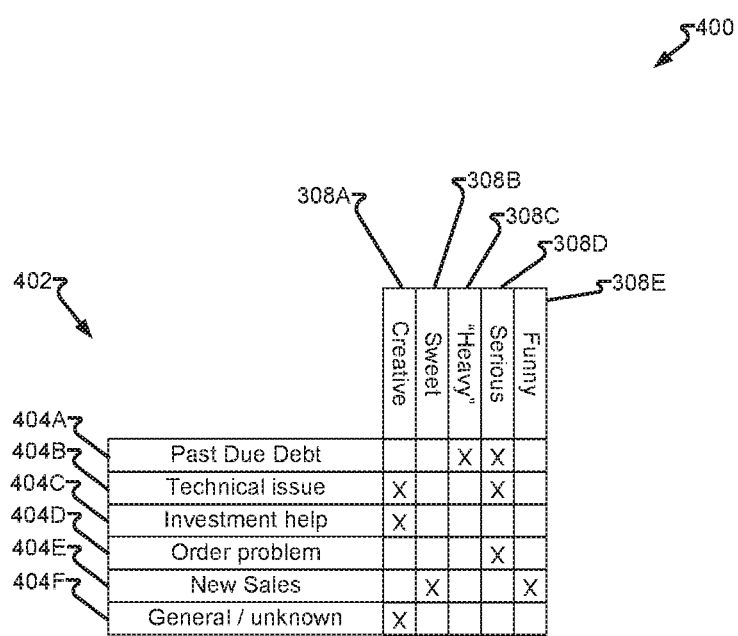
FIG. 4 depicts second data structure in accordance with embodiments of the present disclosure.

FIG. 4 depicts data structure 400 in accordance with embodiments of the present disclosure. In one embodiment, data structure 400 is maintained in a non-transitory data storage, such as customer database 118, for access by one or more processors, such as a processor of server 204 and/or a processor of agent communication device 206.

In one embodiment, data structure 400 comprises a number of records 404 comprising a number of fields. Field 420 identifies a particular purpose. Celebrity attributes 308 identify whether a particular attribute supports a particular purpose. Therefore, with benefit of data structure 300 and data structure 400, a purpose of a call can be associated with particular attributes of a celebrity and celebrity profiles having such the attribute(s) identified and selected, such as selected celebrity profile 222.

Figure 5:
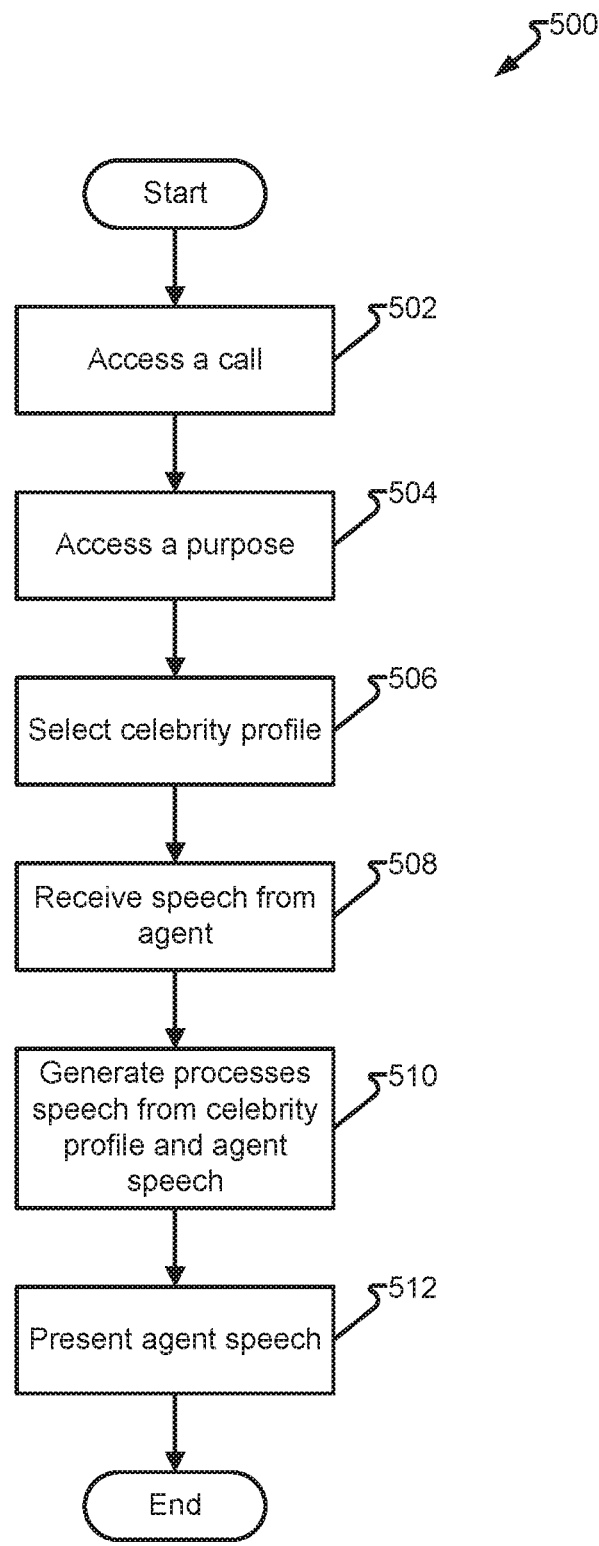
FIG. 5 depicts process in accordance with embodiments of the present disclosure.

FIG. 5 depicts process 500 in accordance with embodiments of the present disclosure. Process 500 may be embodied as machine-executable instructions for execution by a processor, such as a processor of server 204 and/or a processor of agent communication device 206. Process 500 accesses a call in step 502. Accessing may comprise receiving a call from customer communication device 108 and initially connecting the call to an automated embodiment of resource 112 (e.g., an IVR, on-hold, etc.) and, subsequently, connecting the call to agent 210 via agent communication device 206. In other embodiments, step 502 accesses an ongoing call between customer communication device 108 and agent communication device 206.

Step 504 accesses a purpose. As described above, the purpose may be determined by an input on an IVR or similar system from customer 202, a particular number called, an entry in customer database 118, and/or other source. Step 506 accesses and selects a celebrity profile, such as to support a particular purpose of the call and/or to accommodate a preference (or avoid a dislike) of customer 202.

Step 508 receives audio from agent 210, via microphone 212, and with the particular selected celebrity profile 222, and in step 510 generates a modified audio to present modified audio 228 to customer 202 to mimic the particular speech patterns of the selected celebrity. In a further embodiment, camera 208 captures images of agent 210, and also with the selected celebrity profile 222, and in step 510 generates a modified video to present modified image 226 to customer 202 to mimic the appearance of the selected celebrity. Step 512 then causes the modified audio, and optionally modified video, to be encoded for transport via network 104 and decoded by customer communication device 108 for presentation to customer 202. As required, any lag that develops to cause the audio to be out of sync with the video may be corrected to case modified image 226 to be presented on customer communication device 108 as synchronized with modified audio 228.

Figure 6:
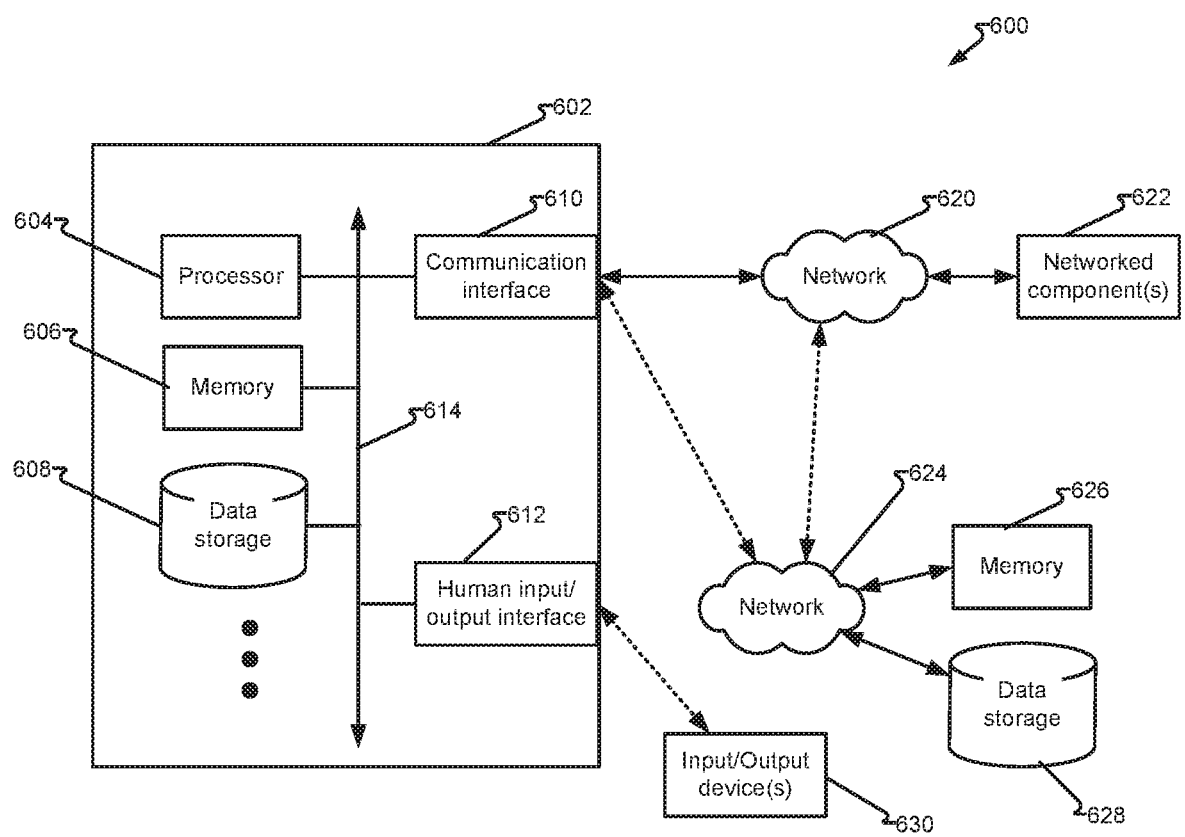
FIG. 6 depicts a third system in accordance with embodiments of the present disclosure.

FIG. 6 depicts device 602 in system 600 in accordance with embodiments of the present disclosure. In one embodiment, server 204 and/or agent communication device 206 may be embodied, in whole or in part, as device 602 comprising various components and connections to other components and/or systems. The components are variously embodied and may comprise processor 604. Processor 604 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 614, executes instructions, and outputs data, again such as via bus 614. In other embodiments, processor 604 may comprise a shared processing device that may be utilized by other processes and/or process owners, such as in a processing array or distributed processing system (e.g., "cloud", farm, etc.). It should be appreciated that processor 604 is a non-transitory computing device (e.g., electronic machine comprising circuitry and connections to communicate with other components and devices). Processor 604 may operate a virtual processor, such as to process machine instructions not native to the processor (e.g., translate the Intel® 9xx chipset code to emulate a different processor's chipset or a non-native operating system, such as a VAX operating system on a Mac), however, such virtual processors are applications executed by the underlying processor (e.g., processor 604) and the hardware and other circuitry thereof.

In addition to the components of processor 604, device 602 may utilize memory 606 and/or data storage 608 for the storage of accessible data, such as instructions, values, etc. Communication interface 610 facilitates communication with components, such as processor 604 via bus 614 with components not accessible via bus 614. Communication interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, etc. In another embodiment, communication interface 610 may comprise, or be comprised by, human input/output interface 612. Communication interface 610 may be configured to communicate directly with a networked component or utilize one or more networks, such as network 620 and/or network 624.

Network 104 may be embodied, in whole or in part, as network 620. Network 620 may be a wired network (e.g., Ethernet), wireless (e.g., WiFi, Bluetooth, cellular, etc.) network, or combination thereof and enable device 602 to communicate with network component(s) 622. In other embodiments, network 620 may be embodied, in whole or in part, as a telephony network (e.g., public switched telephone network (PSTN), private branch exchange (PBX), cellular telephony network, etc.)

Additionally or alternatively, one or more other networks may be utilized. For example, network 624 may represent a second network, which may facilitate communication with components utilized by device 602. For example, network 624 may be an internal network to a business entity or other organization, such as contact center 102, whereby components are trusted (or at least more so) that networked components 622, which may be connected to network 620 comprising a public network (e.g., Internet) that may not be as trusted.

Components attached to network 624 may include memory 626, data storage 628, input/output device(s) 630, and/or other components that may be accessible to processor 604. For example, memory 626 and/or data storage 628 may supplement or supplant memory 606 and/or data storage 608 entirely or for a particular task or purpose. For example, memory 626 and/or data storage 628 may be an external data repository (e.g., server farm, array, "cloud," etc.) and allow device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620. Each of memory 606, data storage 608, memory 626, data storage 628 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 630 may be a router, switch, port, or other communication component such that a particular output of processor 604 enables (or disables) input/output device 630, which may be associated with network 620 and/or network 624, to allow (or disallow) communications between two or more nodes on network 620 and/or network 624. For example, a connection between one particular customer, using a particular customer communication device 108, may be enabled (or disabled) with a particular networked component 622 and/or particular resource 112. Similarly, one particular networked component 622 and/or resource 112 may be enabled (or disabled) from communicating with a particular other networked component 622 and/or resource 112, including, in certain embodiments, device 602 or vice versa. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system.

For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system for presenting an agent as a celebrity to a customer, comprising:
   a network interface to a network; and
   a processor having machine-executable instructions to perform:
      accessing a call comprising a customer communication device utilized by the customer and wherein the call utilizes the network;
      accessing a purpose of the call from at least one of a customer history or a reason for the call, the call comprising video;
      selecting a celebrity profile of a celebrity, from a pool of celebrity profiles, previously determined to match the purpose and wherein the celebrity profile comprises image attributes;
      receiving a received image from the agent from a camera associated with an agent communication device connected to the call;
      generating a processed image from the received image modified with the image attributes; and
      providing video signals to the customer communication device comprising the processed image encoded for transmission over the network.

2. The system of claim 1, wherein:
   the image attributes comprise at least one visual element; and
   the generating of the processed image comprises applying the at least one visual element to an associated portion of image attribute of the received image.

3. The system of claim 2, wherein at least one image attribute comprises a recorded video image.

4. The system of claim 1, wherein the image attributes comprises at least one of eye, nose, ears, mouth, wardrobe element, chin, lips, skin tone, and head size.

5. The system of claim 1, wherein the purpose comprises a preference of the customer.

6. The system of claim 5, wherein the machine-executable instructions cause the processor to further perform:
   accessing a data record indicating at least one of a previously indicated preference or a previously indicated dislike for at least one of the pool of celebrity profiles; and
   wherein the selecting of the celebrity profile, from the pool of celebrity profiles, further comprises selecting the celebrity profile from a subset of the pool of celebrity profiles, the subset of the pool of celebrity profiles being selected from the pool of celebrity profiles wherein ones selected from pool of the celebrity profiles are associated with celebrities further associated with the previously indicated preferences and excludes the pool of celebrity profiles, wherein ones selected from the pool of the celebrity profiles are associated with celebrities further associated with the previously indicated dislike.

7. The system of claim 1, wherein the celebrity profile comprises a first persona of a celebrity in one of a number of prior performances.

8. The system of claim 1, wherein the celebrity profile comprises a second persona of the celebrity in a different one of the number of prior performances.

9. The system of claim 1, wherein the pool of celebrity profiles excludes celebrity profiles of celebrities having a previously determined data attribute counter to the purpose.

10. The system of claim 1, wherein:
    the celebrity profile further comprises a voice attribute; and
    wherein the instructions cause the processor to further perform:
       receiving speech from a microphone associated with the agent communication device;
       generating processed speech from the received speech modified with the voice attributes; and
       providing audio signals to the customer communication device comprising the processed speech encoded for transmission over the network.

11. A method for presenting an agent as a celebrity to a customer, comprising:
    accessing a call comprising a customer communication device utilized by a customer and wherein the call utilizes a network;
    accessing a purpose of the call from at least one of a customer history or a reason for the call;
    selecting a celebrity profile of a celebrity, from a pool of celebrity profiles, previously determined to match the purpose and wherein the celebrity profile comprises voice attributes;
    receiving received speech from an agent from a microphone associated with an agent communication device connected to the call;
    generating processed speech from the received speech modified with the voice attributes; and
    providing audio signals to the customer communication device comprising the processed speech encoded for transmission over the network.

12. The method of claim 11, wherein:
    the voice attributes comprise at least one phoneme of speech of the celebrity; and
    the generating of the processed speech comprises replacing a spoken phoneme within the received speech with the at least one phoneme of speech of the celebrity.

13. The method of claim 12, wherein the at least one phoneme of speech of the celebrity comprises a recording of the celebrity speaking the at least one phoneme of speech.

14. The method of claim 11, wherein the voice attributes at least one of pitch, pace, change in pitch, change in pace, or extraneous sounds.

15. The method of claim 11, wherein the purpose comprises a preference of the customer.

16. The method of claim 15, further comprising:
    accessing a data record indicating at least one of a previously indicated preference or a previously indicated dislike for at least one of the pool of celebrity profiles; and
    wherein the selecting of the celebrity profile, from the pool of celebrity profiles, further comprises selecting the celebrity profile from a subset of the pool of celebrity profiles, the subset of the pool of celebrity profiles being selected from the pool of celebrity profiles wherein ones selected from the pool of the celebrities are associated with celebrities further associated with the previously indicated preferences and excludes the pool of celebrity profiles wherein ones selected from the pool of the celebrities are associated with celebrities further associated with the previously indicated dislike.

17. The method of claim 11, wherein the celebrity profile comprises a first persona of a celebrity in one of a number of prior performances.

18. The method of claim 11, wherein the pool of celebrity profiles excludes celebrity profiles of celebrities having a previously determined data attribute counter to the purpose.

19. The method of claim 11, further comprising:
receiving a video image from a camera associated with the agent communication device and wherein the celebrity profile further comprises visual attributes;
generating a processed image from the video image modified with the visual attributes; and
providing video to the customer communication device comprising the processed image.

20. An agent communication device, comprising:
a microphone;
a network interface to a network; and
a processor having machine-executable instructions to perform:
engaging in a call comprising a customer communication device utilized by a customer via the network;
accessing a purpose of the call from at least one of a customer history or a reason for the call;
selecting a celebrity profile of a celebrity, from a pool of celebrity profiles, previously determined to match the purpose and wherein the celebrity profile comprises voice attributes;
receiving received speech from the agent from the microphone;
generating processed speech from the received speech modified with the voice attributes; and
providing audio signals to the customer communication device comprising the processed speech encoded for transmission over the network.

* * * * *

UNITED STATES PATENT AND TRADEMARK OFFICE
CERTIFICATE OF CORRECTION

PATENT NO. : 11,652,921 B2
APPLICATION NO. : 17/003392
DATED : May 16, 2023
INVENTOR(S) : Shamik Shah et al.

Page 1 of 1

It is certified that error appears in the above-identified patent and that said Letters Patent is hereby corrected as shown below:

In the Specification

Column 24, Line 16, Claim 20 delete the first occurrence of "the" and insert --an-- therein.

Signed and Sealed this
Twelfth Day of September, 2023

Katherine Kelly Vidal
Director of the United States Patent and Trademark Office